United States Patent
Epishin et al.

(10) Patent No.: US 12,549,919 B2
(45) Date of Patent: Feb. 10, 2026

(54) METHOD FOR DETERMINING A PERSONALIZED HEAD-RELATED TRANSFER FUNCTION

(71) Applicant: HARMAN INTERNATIONAL INDUSTRIES, INCORPORATED, Stamford, CT (US)

(72) Inventors: Andrey Igorevich Epishin, Nizhny Novgorod (RU); Anastasia Mikhaylovna Filchenkova, Nizhny Novgorod (RU); Mikhail Sergeevich Kleshnin, Nizhny Novgorod (RU); Joy Lyons, Lake Forest Park, WA (US)

(73) Assignee: Harman International Industries, Incorporated, Stamford, CT (US)

( * ) Notice: Subject to any disclaimer, the term of this patent is extended or adjusted under 35 U.S.C. 154(b) by 193 days.

(21) Appl. No.: 18/259,920

(22) PCT Filed: Dec. 30, 2021

(86) PCT No.: PCT/US2021/065622
§ 371 (c)(1),
(2) Date: Jun. 29, 2023

(87) PCT Pub. No.: WO2022/147205
PCT Pub. Date: Jul. 7, 2022

(65) Prior Publication Data
US 2024/0089689 A1      Mar. 14, 2024

(30) Foreign Application Priority Data

Dec. 31, 2020   (RU) ............................ RU2020144244

(51) Int. Cl.
*H04S 7/00*     (2006.01)
*G06T 7/73*     (2017.01)

(52) U.S. Cl.
CPC ................ *H04S 7/304* (2013.01); *G06T 7/73* (2017.01); *H04S 7/301* (2013.01);
(Continued)

(58) Field of Classification Search
CPC ...... H04S 7/304; H04S 7/301; H04S 2420/01; H04S 7/00; G06T 7/73;
(Continued)

(56) References Cited

U.S. PATENT DOCUMENTS

| | | |
|---|---|---|
| 2006/0067548 A1 | 3/2006 | Slaney et al. |
| 2008/0137870 A1 | 6/2008 | Nicol et al. |
| 2020/0336858 A1* | 10/2020 | Brimijoin, II .......... H04S 7/304 |

FOREIGN PATENT DOCUMENTS

| | | |
|---|---|---|
| JP | 11-96140 A | 4/1999 |
| JP | 2007-187749 A | 7/2007 |

(Continued)

OTHER PUBLICATIONS

Mesharm et al., "P-HRTF: Efficient Personalized HRTF Computation for High-Fidelity Spatial Sound", 2014 IEEE International Symposium on Mixed and Augmented Reality (ISMAR), IEEE, Sep. 10, 2014, 9 pages.

(Continued)

*Primary Examiner* — Yosef K Laekemariam
(74) *Attorney, Agent, or Firm* — Artegis Law Group, LLP (57) ABSTRACT

Computer-implemented method for determining a personalized head-related transfer function, the method comprising: receiving a training dataset comprising one or more training images of ears of one or more first users, a training input vector indicative of one or more first directions relative to the first user's head, and one or more values of the personalized head-related directional function related to the first users and the first directions; training an artificial neural network on the training dataset; receiving an inference
(Continued)

dataset comprising an inference image of a second user's ear or a pair of inference images of the second user's ears, and an inference input vector indicative of a second direction relative to the second user's head; and processing the inference dataset by the artificial neural network to predict one or more personalized values of the directional function, the values related to the second user and the second direction.

20 Claims, 4 Drawing Sheets

(52) U.S. Cl.
CPC ............... *G06T 2207/10028* (2013.01); *G06T 2207/20081* (2013.01); *G06T 2207/20084* (2013.01); *G06T 2207/30196* (2013.01); *H04S 2420/01* (2013.01)

(58) Field of Classification Search
CPC . G06T 2207/10028; G06T 2207/20081; G06T 2207/20084; G06T 2207/30196
See application file for complete search history.

(56) References Cited

FOREIGN PATENT DOCUMENTS

| | | | |
|---|---|---|---|
| JP | 2008-527821 A | 7/2008 | |
| JP | 2019-146160 A | 8/2019 | |
| JP | 2020-170938 A | 10/2020 | |
| KR | 20200042874 | * 4/2020 | ............... H04S 7/00 |
| KR | 20200042874 A | 4/2020 | |
| WO | 2020/075622 A1 | 4/2020 | |

OTHER PUBLICATIONS

Miccini et al., "HRTF Individualization Using Deep Learning", 2020 IEEE Conference on Virtual Reality and 3D User Interfaces Abstracts and Workshops (VRW), IEEE, Mar. 22, 2020, pp. 390-395.

Iida, Kazuhiro, "Fundamentals of Head-Related Transfer Function and its Application to 3-D Sound System", First Edition, Corona Publishing Company, Apr. 13, 2017, 11 pages.

* cited by examiner

METHOD FOR DETERMINING A PERSONALIZED HEAD-RELATED TRANSFER FUNCTION

CROSS-REFERENCE TO RELATED APPLICATIONS

This present application is a national stage application of the International application titled, "Method for Determining a Personalized Head-Related Transfer Function," filed on Dec. 30, 2021, and having application number PCT/US2021/065622, which claims priority benefit of Russian Patent Application titled "Method for Determining a Personalized Head-Related Transfer Function," filed on Dec. 31, 2020, and having Serial No. 2020144244. The subject matter of these related applications are hereby incorporated herein by reference.

FIELD

The present disclosure relates to the determination of personalized head-related directional functions. In particular, the present disclosure relates to systems, methods and devices for determining a personalized frequency response of a personalized head-related transfer function (HRTF) based on images of ears. Applications include audio processing.

BACKGROUND

The human auditory system is not only able to perceive sound, but also to determine the direction the sound is coming from. The human brain achieves this by using three sound features: First, sound coming from one side of the head is registered as louder by the ear closer to the source (detection of the inter-aural amplitude difference). Second, sound reaches the ear closer to the head earlier (detection of the inter-aural time difference). Third, the sound spectrum is distorted as the sound propagates through the listener's body, including shoulders, head, and outer and middle ear, until it reaches the inner ear that converts sound waves into electric nerve signals. In particular, the pinna of the outer ear is highly asymmetric, and it is configured to modify the sound spectrum depending on the direction of the sound source relative to the head.

Therefore, in order to create an immersive sound environment, for example for a virtual reality application, positions of sound sources have to be mimicked by generating inter-aural amplitude and time differences, and by modifying the sound spectrum depending on the direction of the source and on the anatomy of the listener. The spectral modification is achieved using a head-related transfer function (HRTF). In order to achieve a natural sound experience for the listener, the HRTF must be individualized to match the listener's anatomy, in particular the form of the pinnae of the listener's ears.

Head-related transfer functions can be generated experimentally, i. e. by placing a microphone in a user's ear and recording sound generated by loudspeakers in proximity to the user's head. However, this procedure is complicated and time-consuming. Therefore, a need exists to predict an individualized head-related transfer function or a frequency response thereof based on a simpler measurement.

SUMMARY

Disclosed and claimed herein are methods and systems for determining a personalized head-related transfer function based on one or more images of ears.

According to a first aspect, a computer-implemented method for determining a personalized head-related transfer function is disclosed. The method comprises: receiving a first training data subset comprising one or more training images of ears of one or more first users, and a training input vector indicative of one or more first directions relative to the first user's head; receiving, as a second training data subset, one or more values of the personalized head-related directional function related to the first users and the first directions of the first training data subset; supplying the first training data subset and the second training data subset to an artificial neural network as a training dataset; training the artificial neural network on the training dataset to predict one or more personalized values of the directional function; receiving an inference dataset comprising an inference image of a second user's ear or a pair of inference images of the second user's ears, and an inference input vector indicative of a second direction relative to the second user's head; and processing the inference dataset by the artificial neural network to predict one or more personalized values of the directional function, the values related to the second user and the second direction.

The method is directed at determining a personalized head-related directional function. The function is different for each individual as it depends on anatomic features, in particular the shapes of the pinnae. The function allows calculating functional values that depend on a direction and that relate to the auditory system, such as changes in volume, spectrum, or latency of sound waves as they arrive in the inner ear, depending on the direction of the impinging sound wave. As will be described in more detail below, the function may comprise a personalized head-related transfer function in an embodiment.

The method uses an artificial neural network, for example a convolutional neural network, and comprises a training phase and an inference phase. In the training phase, a training dataset is received that comprises a first and a second training data subset. The first training data subset relates to possible input data and comprises an image of a pinna and a direction which may be given, for example, in spherical or Cartesian coordinates. The second training data subset relates to output data corresponding to the input data and comprises one or more values of the personalized head-related directional function related to the first users and the first directions of the first training data subset. The one or more values supplied for training may have been determined by experimental measurements or by simulations and are considered the correct values. If, in an embodiment, the individualized head-related directional function relates to a frequency response of a head-related transfer function, then a value of the function may be a spectral response function that relates the sound spectrum arriving in the inner ear to the spectrum of the impinging sound. The artificial neural network is trained to reproduce the second training data subset, typically using a large number of images of the pinnae of different first users, and a large number of different directions. The first users may be test users that participate in an experimental measurement session in a specialized laboratory. Training may involve using a large number of training datasets from a large number of test users, wherein the training datasets comprise images of the pinnae of both ears and recorded head-related directional functions for a fixed number of directions. The method thus allows training a neural network with data from a laboratory setting, and then applying the trained neural network for users that have not participated in laboratory tests. Upon inference, the trained artificial neural network receives an image of one or both of the second user's pinnae and one or more direction vectors. The artificial neural network then predicts the personalized function for the second user. In particular, a fixed set of directions, given as pairs of azimuthal and elevation angles, may be used both as the first directions for training and second directions for inference. As far as only a discrete set of directions is used for inference, values may be interpolated for intermediary directions. Therefore, a second user, which may be a consumer, need not undergo a measurement to determine a head-related directional function, but simply take pictures of one or both pinnae for determination of the function. For example, a pair of headphones may be individualized such that an end user can provide images of his pinnae to an algorithm, the algorithm calculates a directional function according to the method described above, and the function may be applied to any sound played by the headphones to generate a personalized sound. For example, sound effects of a film or computer game may be tailored to the auditory system of the user to yield a sound experience that fits precisely to the user's auditory system. Using a plurality of functions for different directions can allow creating an immersive sound environment for the user.

In an embodiment, the directional function comprises a personalized head-related impulse response function. The HRIR describes changes in sound when it traverses the human body and is modified by anatomic features for example by refraction, diffraction, and attenuation by head and shoulders.

In a further embodiment, the directional function comprises a personalized head-related transfer function. Similarly to the head-related impulse response, HRIR, the head-related transfer function, HRTF, describes changes in sound when it traverses the human body and is modified by anatomic features for example by refraction, diffraction, and attenuation by head and shoulders.

For the purposes of the present disclosure, the HRIR is defined as the ratio of the sound pressure at a blocked ear canal to the sound pressure at the center of the head. The center of the head is defined as the central point between the ears. The HRIR depends in general on the position of the source of the sound (i. e. distance, elevation, and azimuth) and anatomic features (e. g. size and shape of head, shape of the pinna), and wavelength. The Fourier Transform of the HRIR is referred to as the HRTF. The amplitude of the HRTF without the phase is referred to as the frequency response.

The HRTF thus yields a value for the transmission depending on the direction of the impinging sound wave, and on the wavelength of the sound. The HRTF can therefore be expressed as a set of spectra, each representing a spectral amplitude of a transmission as a function of frequency for one angle. A spectrum can be represented as a vector comprising discrete values. Spectra for a plurality of directions are needed. For example, the whole sphere around a user's head may be covered with azimuthal and elevation angles in steps of, e. g., 20 degrees. Finer steps may be chosen to make the auditory experience more natural for the users, whereas coarser steps allow saving computational cost and memory space. The personalized frequency responses can then be applied to a sound signal, e. g. from a film, a simulation, or a computer game, to generate the impression that sound comes from a second direction.

In a further embodiment, the directional function comprises a frequency response of a personalized head-related transfer function. Thereby, only the spectral dependence of the HRTF is determined using the method. The total amplitude and the amplitude difference between ears are determined by using known physical relations on the amplitude drop depending on the distance and direction, without resorting to the artificial neural network. This increases the convergence of the artificial neural network and the reliability of the method.

In a further embodiment, the frequency response is a free-field frequency response. This means that the frequency response is calculated based on the assumption that the sound source is located at a sizable distance from the user. This is an advantage for the determination of the frequency response. In a laboratory setting for determining the training dataset, for example in an anechoic room, sound signals may be created with speakers at a distance that is comparably far away. The sound signal arriving in the ear may then be measured using an intra-aural microphone. The head-related impulse response is then determined by subtracting the signal emitted by the speaker from the signal recorded by the microphone. In this setup, neither the size of the source nor any reflections influence the measurement. This allows creating training datasets that reflect only the features of the first users' anatomy.

In a further embodiment, the training dataset and/or inference dataset comprises: at least a pair of an image of the left ear and an image of the right ear of the same user, wherein one of the images of a pair is mirrored; and at least a pair of a first input vector corresponding to the first and/or second direction and a second input vector determined by mirroring the first input vector relative to a plane through the center of the user's head and perpendicular to the line between the user's ears.

Thereby, the artificial neural network can be trained on the left and the right ear at the same time, and data from left and right ears are included in the same dataset. In said embodiment, both one of the images and the corresponding direction vector are transformed to be similar to the other image and the other direction vector. Mirroring one of the vectors may lead to 270 degrees azimuth regarding the right ear being equivalent to 90 degrees for the left ear. The artificial neural network may calculate the personalized values separately for the left and the right ear. The personalized values of the directional function predicted by the artificial neural network thus comprise a pair of values, one for the right ear and one for the left ear. Both values of this pair correspond to sound from the same direction, which in general relates to the same external source. If for example, the source is in front of the left ear, i. e. at 90 degrees azimuth in spherical coordinates, then it is opposite the right ear, which leads to the filter function for the left ear being similar, but not identical, to the filter function for the right ear in the case of a source in front of the right ear, i. e. at 270 degrees azimuth.

In a further embodiment, the image is a photograph. The photograph may be taken with a digital camera and saved in a memory on a mobile device or a network-accessible server. Together with a plurality of directions, a full set of frequency responses covering all directions can be obtained. There is no need for further data, in particular anthropometric data. Furthermore, the photograph need not be converted into a set of parameters pertaining to the ear, such as vertical and lateral directions of the pinna, etc. Rather, the photograph is simply entered into the artificial neural network. Thereby, the second user, which may be a consumer using headphones for an immersive sound environment, need only take two images to allow the adaptation of the sound.

In a further embodiment, the image is a depth map. The depth map is a two-dimensional grayscale image, wherein the position of each pixel relates to a lateral position, as is the case for a photograph, and the value relates to the height of the skin surface at that lateral position. The depth map may be obtained by processing one or more photographs by an image processing algorithm to determine the three-dimensional contour of the ear. Alternatively, a plurality of visible or infrared light markers may be projected onto the ear when recording a photograph, which allows obtaining information on the three-dimensional structure of the pinna. This approach is known as usage of a depth camera. Although a depth map does not comprise the full three-dimensional structure of the ear, it gives information on which the artificial neural network can be trained, but is also comparably easy to measure. The depth map therefore provides a middle ground between accuracy of the determination of the function, for which a full three-dimensional model of the pinna is more suitable, and the use of a photograph, which is easier to take.

In a further embodiment, the method further comprises determining the second training data subset by determining an input sound signal sent from a first direction relative to the user's head; recording a transmitted sound signal within an ear of the first user; determining a head-related impulse response based on the input sound signal and the transmitted sound signal; transforming the head-related impulse response into a frequency space to generate the second training data subset.

Here, the first users may be test users that participate in an experimental measurement session in a specialized laboratory. The input sound signal may be sent using a loudspeaker or another sound source. The transmitted sound signal may be recorded using intra-aural microphones within the ear. In order to determine a free-field transfer function, an anechoic room may be used. Alternatively, the room may comprise objects, such as reflecting surfaces, to determine transfer functions in presence of reflections. Determination of the head-related impulse response comprises subtracting the input sound signal from the transmitted sound signal. The head-related impulse response is then transformed into frequency space, e. g. by applying a Fourier transform or a wavelet transform, to generate a head-related transfer function which serves then as the second training data subset. This may be combined with further processing steps, such as normalizing the values so that only relative spectral differences are reflected. This is particularly advantageous if other techniques are used to account for the amplitude difference related to different directions.

In a further embodiment, processing the training and/or inference dataset by the artificial neural network comprises: extracting, by a head block of the artificial neural network, features from the image of the pinna to generate feature data; creating, for each coordinate of the direction vector, a replica of the feature data; multiplying each replica with a coordinate of the input vector to generate a plurality of weighted replicas; and processing, by a tail block of the artificial neural network, the weighted replicas to predict the head-related directional function related to the second user and the second direction.

The processing step of extracting feature data allows the generation of pre-processed data related to the extracted features. Known techniques for feature extraction, in particular combinations of convolution, pooling, and fully connected layers, or any other form of machine learning algorithm may be used. The feature data are then copied to create one replica for each coordinate of the direction vector. The direction vector may be given in Cartesian or spherical coordinates and thus have three components. Then, three replicas of the data are created and multiplied with the value of the corresponding coordinate to generate weighted replicas. The tail block then processes the weighted replicas. The processing step may comprise combinations of convolution, pooling, and fully connected layers, or any other form of machine learning algorithm. Alternatively, six-component vectors may be used, as detailed below. The approach of using head and tail blocks increases the reliability and the convergence. Although head and tail blocks may be trained independently, it is possible to train the whole algorithm comprising both blocks together. This reduces the complexity of the training process.

In a further embodiment, the input vector is specified in a positive definite six-component format. Thereby, only positive values are used, which improves the convergence and the performance of the artificial neural network.

In a further embodiment, the method further comprises: specifying one or more of the input vectors in Cartesian coordinates and transforming said input vector in a format comprising six components by defining a pair of components for each Cartesian coordinate, wherein the first component of each pair is identical to the Cartesian coordinate if the Cartesian coordinate is not negative and zero if the Cartesian coordinate is negative; and wherein the second component of each pair is zero if the Cartesian coordinate is not negative and identical to the absolute value of the Cartesian coordinate if the Cartesian coordinate is negative.

Thereby, a 3-dimensional Cartesian direction vector (X, Y, Z) is transformed into a 6-dimensional vector (Xp, Yp, Zp, Xn, Yn, Zn). Here, $Xp=X$ if $X \geq 0$ and $Xp=0$ if $X<0$. Furthermore, $Xn=0$ if $X \geq 0$ and $Xn=abs(X)$ if $X<0$. The other coordinates are calculated from Y and Z in the same way. Thereby, all components are positive, and half of the components are zero, which makes the convergence of the training faster.

In a further embodiment, the method further comprises: post-processing the one or more personalized values of the directional function to generate a filter, and applying the filter to a second input signal.

This filter may be generated by transforming the frequency response from the frequency domain into the time domain, for example by applying an inverse Fourier transform. Furthermore, different volume levels may be applied to account for the inter-aural amplitude difference, and the signal may be shifted in time to account for the inter-aural time difference. Thereby, a personalized head-related impulse, HRIR, based filter is generated. However, also other steps may be undertaken to generate other filters. Application of a personalized head-related impulse filter to the second input sound signal generates a sound signal that appears to a second user as if it came from the second direction. This approach allows using the artificial neural network only in order to determine spectral amplitude differences related to different directions. Thereby, the computational cost is reduced. For example, a second user may be a consumer using headphones of an immersive sound system. The head-related impulse filter may then be generated using images of the user's pinnae, so that the second input sound signal can then be treated to appear as coming from a predetermined direction.

In a further embodiment, the method further comprises determining and/or storing the second personalized frequency response in a mobile device. For example, any step of the method according to the present disclosure may be executed on a mobile device. Alternatively, the artificial neural network may be trained on a compute server, and only the inference step is to be executed on a mobile device. According to yet another alternative, the artificial neural network may be used on a network-accessible server, to benefit from computing resources of a server and from centralized maintenance and updates of the artificial neural network. For example, an artificial neural network may be developed and trained on one or more compute servers, and then stored onto a network accessible server for execution of the inference steps for a plurality of second users. Thereby, the artificial neural network behaves consistently for the plurality of second users.

In a further embodiment, the method further comprises determining and/or storing the one or more personalized values of the directional function on a network-accessible server. Thereby, user profiles, each comprising the personalized values for a particular second user for one or more devices, may be used to manage configurations. This allows accessing the second personalized frequency values by a plurality of mobile devices, so that immersive sound environments can be created consistently on different devices used by the same user, and for devices that are shared by several users.

Other aspects comprise pairs of headphones, data processing systems, computer program products, and computer-readable storage media comprising computer program products, all of which are configured to carry out the method of the present disclosure. All properties of the first aspect of the present disclosure apply to the other aspects as well.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION OF THE PREFERRED EMBODIMENTS

Figure 1:
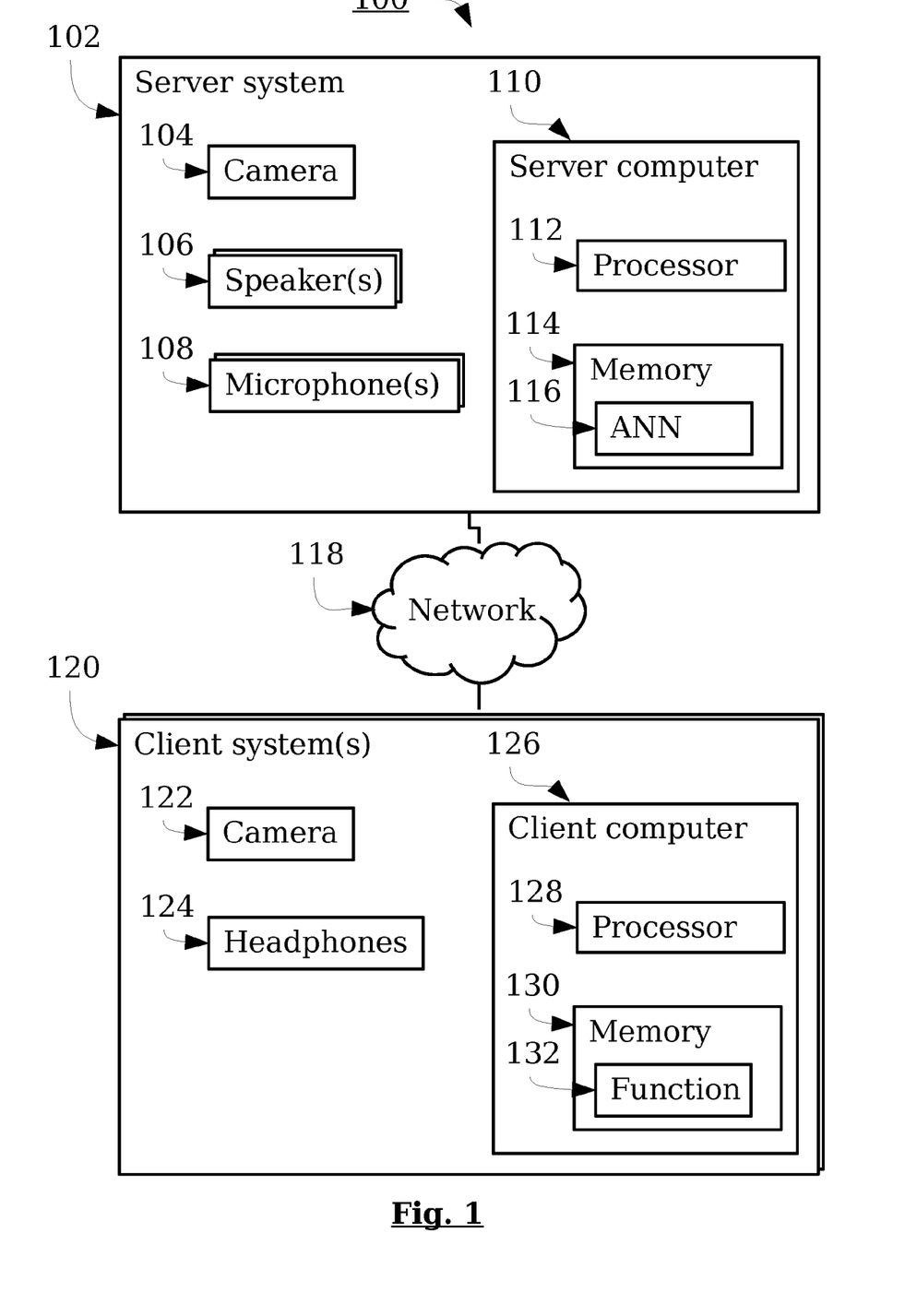
FIG. 1 shows a block diagram of a system according to an embodiment of the present disclosure.

FIG. 1 shows a block diagram of a system 100 according to an embodiment of the present disclosure. The system 100 comprises a server system 102 and one or more client systems 120, which are communicatively coupled via a network 118.

The server system 102 is configured to train and apply the artificial neural network. For training, data from one or more first users are determined. The first users may be test subjects who participate in a measurement campaign to determine training datasets. Determining the training datasets comprises taking images of a first user's ears with a camera 104. The camera 104 may be a conventional photo camera, or a camera with some 3-dimensional functionality. For example, a depth camera may be used, wherein light markers are projected onto the pinna and their positions are used to obtain more information on the shape. The one or more speakers 106 and one or more microphones 108 may be part of a setup for the determination of a head-related free-field impulse response in an anechoic chamber. Said setup may comprise an intra-aural microphone that is to be placed into a first user's ear, and a plurality of speakers that are arranged spherically around the first user's head, each at a distance of 1.2 meters of the center of the head to generate a free-field sound signal. A plurality of input sound signals may be generated. The intra-aural microphone is configured to record the transmitted sound and to block the ear at the same time. However, the present disclosure is not limited to this type of cameras, speakers, and microphones. Rather, different devices may be used. For example, a plurality of speakers may be placed closer to the head to generate a near-field signal. Rather than using an anechoic chamber, a reverberating environment may be used. In yet another example, even no speakers but other sources of sound may be used. In that case, two signals related to that sound wave may be measured in two points in space. The two signals may comprise a signal outside the head and a transmitted signal as measured by an intra-aural microphone. The generated data may then be processed by a server computer 110, with a processor 112 and a memory 114. Processing may comprise training the artificial neural network (ANN) 116 on the data, testing the ANN 116 using generated data, and executing the inference steps to predict a directional function. Processing may further increase pre-processing and post-processing the data as detailed below. The server system 102 may be localized in one place, but may, alternatively, comprise devices 104-116 dispersed over different locations and connected via a network, e. g. network 118, such as the Internet.

The one or more client systems 120 may comprise a camera 122, a pair of headphones 124, and a client computer 126 comprising a processor 128 and a memory device 130. The client system 120 may be used by a second user, who may be a consumer using the headphones. The camera 122 is configured to take one or more photos of the second user's ears. Camera 122 may be a depth camera as detailed above. For example, the camera 122 and the client computer 126 may be comprised in a smartphone. The client computer 126 may then pre-process the image, for example by generating a depth map based on data generated by the camera 122, which may, for example, comprise a photograph, or some three-dimensional data. Further pre-processing may include mirroring one of the images. The images may then be sent via network 118 to the server system 102. The server computer 110 may then generate a predetermined number of direction vectors. The artificial neural network 116 may then process the images and direction vectors to generate a directional function. The directional function may, for example, comprise a head-related impulse response for each direction. The directional function 132 may then be sent to the client computer 126 via network 118 and stored in memory 130. Thereby, data transfer via the network is only necessary for calibration of the client system for a new user. The client computer 126 then may apply the function 132 to original sound signals to be emitted by headphones. Further steps, such as modifying the amplitudes of left and right ears and inducing a phase shift to correct for the latency may be effected. Alternatively, these steps may also be executed by a second client computer (not shown), which may be comprised in a set of headphones. This allows generating the impression that the original sound signals come from a predetermined direction. The predetermined direction may be stored in metadata stored together with the original sound signals.

It should be noted that the system 100 of FIG. 1 shows only an exemplary embodiment. Alternatively, only training and testing of the artificial neural network may be executed by the server system, and the inference steps may be executed on the one or more client systems. In yet another alternative, a single localized system comprising camera, speakers, microphones and a computer may be used, and all method steps are executed by the system.

Figure 2:
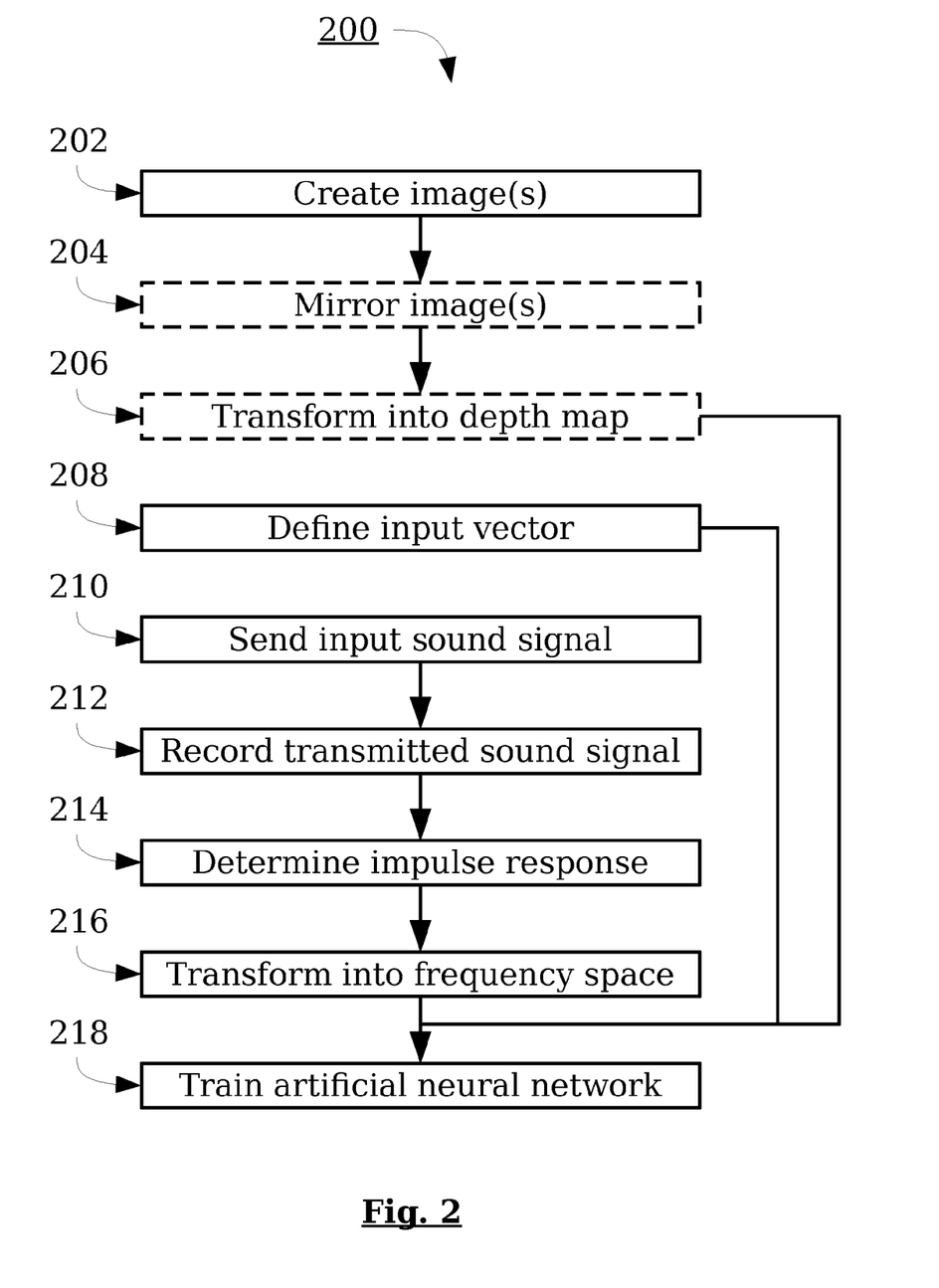
FIG. 2 shows a flow chart of a computer-implemented method for training an artificial neural network to determine a personalized head-related directional function according to an embodiment of the present disclosure.

FIG. 2 shows a flow chart of a computer-implemented method for training an artificial neural network to determine a personalized head-related directional function according to an embodiment. At 202, one or images are created, for example by taking a photograph with a camera. Although images comprising more three-dimensional data may be used, a photograph is already sufficient to train the artificial neural network. Additionally, optional pre-processing steps may be taken: At 204, the image of one of the ears of the same person is mirrored. That is, the image is flipped right-left. This provides the artificial neural network with images of two ears, which have identical orientation but represent the differences in the shape of ears, in particular, the shape of the pinnae, which are present. The one or more images may be transformed, 206, into depth maps, i. e. a two-dimensional grayscale image, wherein gray values represent positions of the skin surface in vertical orientation. These steps can improve the conversion behavior of the artificial neural network. At 208, one or more input vectors corresponding to a direction are specified. The input vector may be given in Cartesian or spherical coordinates. For example, a set of input vectors indicative of a predetermined number of directions may be specified. For example, the directions may span the whole angular range of a sphere in 20 degree steps for both azimuthal and elevation angles to train the artificial neural network on the full range of available angles. The step size is a tradeoff between experimental and computational effort on the one hand, and precision of the trained artificial neural network on the other hand. The first training data subset comprises the one or more images and the one or more input vectors.

Steps 210-216 relate to generating the directional function to be submitted to the artificial neural network as the second training data subset. In the present exemplary embodiment, the directional function comprises a head-related transfer function, HRTF. At 210, an input sound signal is sent, e. g., by one of the speakers 106. The input sound signal may comprise a sine sweep, a log sine sweep, or another signal that allows covering the spectrum. At 212, a transmitted signal is recorded, e. g. by one of the microphones 108. Processing the signals includes determining, 214, an impulse response. This may include subtraction of the input sound signal from the transmitted sound signal to generate a head-related impulse response, HRIR. At 216, the impulse response is transformed into frequency space, e. g. by Fourier transform or wavelet transform. The output of step 216 yields the second training data subset. The first training data subset and the second training data subset are then sent as a training dataset to the artificial neural network. At 218, the artificial neural network is trained on the training dataset. Training may comprise one or more of the steps explained with reference to FIG. 4.

Figure 3:
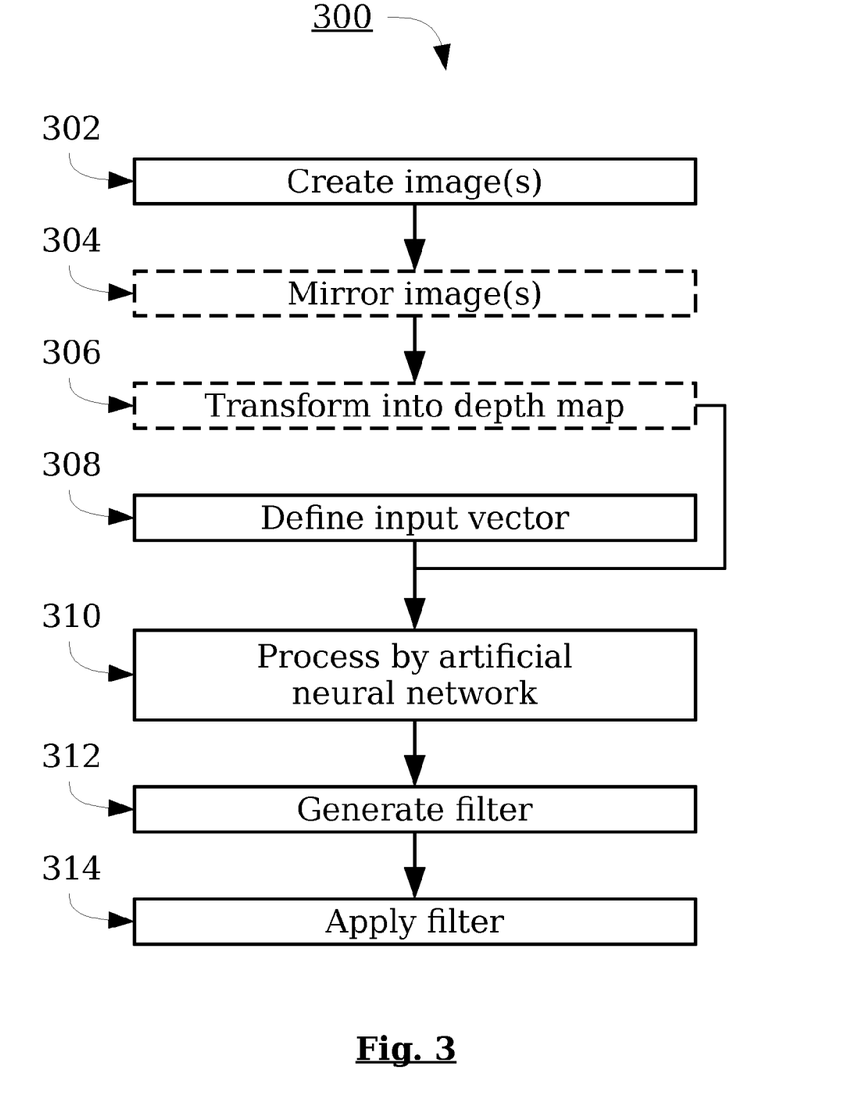
FIG. 3 shows a flow chart of a computer-implemented method for determining a personalized head-related directional function using an artificial neural network according to an embodiment of the present disclosure.

FIG. 3 shows a flow chart of a computer-implemented method for determining a personalized head-related directional function using an artificial neural network according to an embodiment. This relates to the inference steps of the artificial neural network. At steps 302-306, one or more images of one or both ears of the user are created, and optionally mirrored and/or transformed into one or more depth maps. These steps are principally the same as steps 202-206 above, although the images show the ears of the second user, and may be taken with different hardware. At 308, one or more input vectors are defined. At 310, the artificial neural network processes the input dataset, i. e. one or more images and the one or more input vectors, to predict a value of the directional function for the one or more directions indicated by the vectors. This may comprise calculating a head-related transfer function (HRTF). At 312, a filter is generated based on the directional function. For example, if the artificial neural network determines an HRTF, then a transform into time domain, e. g. by inverse Fourier transform, determines filter function that can then be applied, 314, to one or more original sound signals, to create the impression that the sound signal is coming from the directions indicated by the vectors. For example, for each predetermined direction, a direction vector may be generated, so that the artificial neural network may process the one or more images and the vector to generate a value of the directional function related to that predetermined direction. This allows determining the filter function at high accuracy. Alternatively, a set of input vectors, e. g. spanning all angles of the sphere in 20 degree steps, is generated at step 308. Then, the artificial neural network generates a value of the directional function for each direction. Also, a filter is generated at each direction. The set of filters may then be saved in memory 130, so that the filters can be applied to sound signals. In order to filter a sound signal to create the impression that it is coming from a direction for which no filter exists in the set, a filter may be generated by interpolation of filters of the set.

Figure 4:
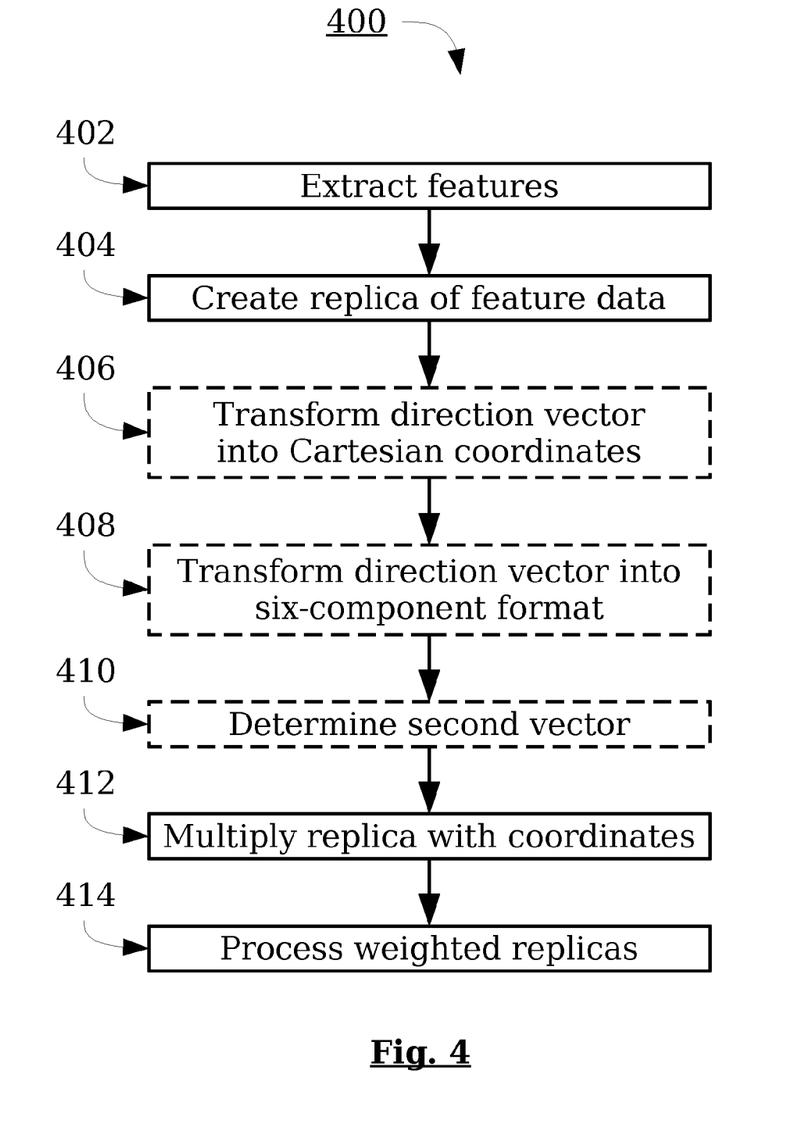
FIG. 4 shows a flow chart of a computer-implemented method for processing a training and/or inference dataset using an artificial neural network according to an embodiment of the present disclosure.

FIG. 4 shows a flow chart of a computer-implemented method 400 for processing a training and/or inference dataset using an artificial neural network according to an embodiment. The steps of method 400 may be sub-steps of the training step 218 and the inference step 310. At 402, the one or more images are processed by a head block of the artificial neural network to extract features. At 404, the feature data are then copied to create one replica for each coordinate of the direction vector, e. g. six replicas if the direction vector is to be determined in six components. The direction vector, as specified in steps 208, 308, is optionally transformed, 406, into Cartesian coordinates. The use of Cartesian coordinates leads to faster conversion of the artificial neural network. At 408, the direction vector is converted into a six-component format. Such a format may be defined by converting each component into a pair of components, one of which is identical to the modulus of the original component and the other one is zero. This leads to faster convergence of the artificial neural network. At 410, a second vector is optionally determined. If images of left and right ears of the same user are processed together to train the neural network or to predict values of the directional function for both ears for the same source simultaneously, the first vector may indicate the direction of the source with respect to the first ear, and the second vector may indicate the direction of the source with respect to the second ear. In that case, the second vector is mirrored at the plane through the center of the head, and perpendicular to the line between the ears. For example, 90 degrees azimuth for the left ear (first vector) corresponds to 270 degrees azimuth for the right ear (second vector). This notwithstanding, all coordinates may be specified in Cartesian coordinates. At 412, each of the replicas is multiplied with a coordinate value to generate weighted replicas. At 414, the artificial neural network processes the weighted replicas to predict the value of the directional function.

REFERENCE SIGNS

100 System
102 Server system
104 Camera
106 Speaker(s)
108 Microphone(s)
110 Server computer
112 Processor
114 Memory
116 Artificial neural network
118 Network
120 Client system(s)
122 Camera
124 Headphones
126 Client computer
128 Processor
130 Memory
132 Function
200 Computer-implemented method for determining a personalized head-related directional function
202-218 Steps of a computer-implemented method for determining a personalized head-related directional function
300 Computer-implemented method for determining a personalized head-related directional function using an artificial neural network.
302-314 Steps of a computer-implemented method for determining a personalized head-related directional function using an artificial neural network.
400 Computer-implemented method for processing a training and/or inference dataset using an artificial neural network.
402-414 Steps of a computer-implemented method for processing a training and/or inference dataset using an artificial neural network.

The invention claimed is:

1. A computer-implemented method for determining a personalized head-related directional function, the method comprising:
receiving a first training data subset comprising:
one or more training images of ears of one or more first users, and
training input vectors indicative of one or more first directions relative to heads of the one or more first users;
receiving, as a second training data subset, one or more values of a personalized head-related directional function related to the one or more first users and the one or more first directions of the first training data subset;
supplying the first training data subset and the second training data subset to an artificial neural network as a training dataset;
training the artificial neural network on the first training data subset and the second training data subset to predict one or more personalized values of the personalized head-related directional function;
receiving an inference dataset comprising:
an inference image of an ear of a second user or a pair of inference images of ears of the second user, and
an inference input vector indicative of a second direction relative to a head of the second user; and
processing the inference dataset by the artificial neural network to predict the one or more personalized values of the personalized head-related directional function, the personalized values being related to the second user and the second direction.

2. The method of claim 1, wherein the personalized head-related directional function comprises a personalized head-related impulse response.

3. The method of claim 1, wherein the personalized head-related directional function comprises a personalized head-related transfer function.

4. The method of claim 1, wherein the personalized head-related directional function comprises a frequency response of a personalized head-related transfer function.

5. The method of claim 4, wherein the frequency response is a free-field frequency response.

6. The method of claim 1, wherein at least one of the training dataset or the inference dataset comprises:
at least a pair of an image of a left ear and an image of a right ear of a same user, wherein one of the images of the pair is mirrored; and
at least a pair of a first input vector corresponding to at least one of the first directions or the second direction and a second input vector determined by mirroring the first input vector relative to a plane through a center of a head of a user and perpendicular to a line between ears of the user.

7. The method of claim 6, wherein the image of the left ear is a photograph.

8. The method of claim 6, wherein the image of the left ear is a depth map.

9. The method of claim 1, further comprising determining the second training data subset by:
determining an input sound signal sent from a third direction relative to a head of one of the one or more first users;
recording a transmitted sound signal within an ear of the one of the one or more first users;
determining a head-related impulse response based on the input sound signal and the transmitted sound signal; and
transforming the head-related impulse response into a frequency space.

10. The method of claim 1, wherein processing the inference dataset by the artificial neural network comprises:
extracting, by a head block of the artificial neural network, features from an image of a pinna of one of the ears of the second user to generate feature data;
creating, for each coordinate of a direction vector, a replica of the feature data;
multiplying each replica with a coordinate of the inference input vector to generate a plurality of weighted replicas; and
processing, by a tail block of the artificial neural network, the weighted replicas to predict the personalized head-related directional function related to the second user and the second direction.

11. The method of claim 1, wherein one or more of the training input vectors or the inference input vector are specified in a positive definite six-component format.

12. The method of claim 11, further comprising:
specifying one or more of the training input vectors or the inference input vector in Cartesian coordinates and
transforming one or more of the training input vectors or the inference input vector into a format comprising six components by defining a pair of components for each Cartesian coordinate,
wherein a first component of each pair is identical to the Cartesian coordinate if the Cartesian coordinate is not negative and zero if the Cartesian coordinate is negative; and wherein a second component of each pair is zero if the Cartesian coordinate is not negative and identical to an absolute value of the Cartesian coordinate if the Cartesian coordinate is negative.

13. The method of claim 1, further comprising:
post-processing the one or more personalized values of the personalized head- related directional function to generate a filter, and
applying the filter to a second input sound signal.

14. The method of claim 1, further comprising determining, storing, or determining and storing the one or more personalized values of the personalized head- related directional function in a mobile device.

15. The method of claim 1, further comprising determining, storing, or determining and storing the one or more personalized values of the personalized head- related directional function on a network-accessible server.

16. A system comprising:
memory storing instructions; and
one or more processors, that when executing the stored instructions are configured to perform a method comprising: receiving a first training data subset comprising:
one or more training images of ears of one or more first users, and
training input vectors indicative of one or more first directions relative to heads of the one or more first users;
receiving, as a second training data subset, one or more values of a personalized head-related directional function related to the one or more first users and the one or more first directions of the first training data subset;
supplying the first training data subset and the second training data subset to an artificial neural network as a training dataset;
training the artificial neural network on the first training data subset and the second training data subset to predict one or more personalized values of the personalized head-related directional function;
receiving an inference dataset comprising:
an inference image of an ear of a second user or a pair of inference images of ears of the second user, and
an inference input vector indicative of a second direction relative to a head of the second user; and
processing the inference dataset by the artificial neural network to predict the one or more personalized values of the personalized head-related directional function, the personalized values being related to the second user and the second direction.

17. A non-transitory computer-readable storage medium comprising instructions which, when executed by one or more processors, cause the one or more processors to perform the steps of:
receiving a first training data subset comprising:
one or more training images of ears of one or more first users, and
training input vectors indicative of one or more first directions relative to heads of the one or more first users;
receiving, as a second training data subset, one or more values of a personalized head-related directional function related to the one or more first users and the one or more first directions of the first training data subset;
supplying the first training data subset and the second training data subset to an artificial neural network as a training dataset;
training the artificial neural network on the first training data subset and the second training data subset to predict one or more personalized values of the personalized head-related directional function;
receiving an inference dataset comprising:
an inference image of an ear of a second user or a pair of inference images of ears of the second user, and
an inference input vector indicative of a second direction relative to a head of the second user; and
processing the inference dataset by the artificial neural network to predict the one or more personalized values of the personalized head-related directional function, the personalized values being related to the second user and the second direction.

18. The non-transitory computer-readable storage medium of claim 17, wherein at least one of the training dataset or the inference dataset comprises:
at least a pair of an image of a left ear and an image of a right ear of a same user, wherein one of the images of the pair is mirrored; and
at least a pair of a first input vector corresponding to at least one of the first directions or the second direction and a second input vector determined by mirroring the first input vector relative to a plane through a center of a head of a user and perpendicular to a line between ears of the user.

19. The non-transitory computer-readable storage medium of claim 18, wherein the image of the left ear is a photograph or a depth map.

20. The non-transitory computer-readable storage medium of claim 17, wherein the steps further comprise determining the second training data subset by:
determining an input sound signal sent from a third direction relative to a head of one of the one or more first users;
recording a transmitted sound signal within an ear of the one of the one or more first users;
determining a head-related impulse response based on the input sound signal and the transmitted sound signal; and
transforming the head-related impulse response into a frequency space.

* * * * *